United States Patent
Johnson

(10) Patent No.: US 12,218,992 B2
(45) Date of Patent: Feb. 4, 2025

(54) ADAPTIVE COLLABORATIVE REAL-TIME REMOTE REMEDIATION

(71) Applicant: Pearson Education, Inc., Bloomington, MN (US)

(72) Inventor: Alex Johnson, Denver, CO (US)

(73) Assignee: PEARSON EDUCATION, INC., Bloomington, MI (US)

( * ) Notice: Subject to any disclaimer, the term of this patent is extended or adjusted under 35 U.S.C. 154(b) by 0 days.

(21) Appl. No.: 17/095,537

(22) Filed: Nov. 11, 2020

(65) Prior Publication Data

US 2022/0150290 A1     May 12, 2022

(51) Int. Cl.
| | |
|---|---|
| *H04L 65/4053* | (2022.01) |
| *G09B 5/10* | (2006.01) |
| *G09B 5/12* | (2006.01) |
| *G09B 7/00* | (2006.01) |

(52) U.S. Cl.
CPC ............ *H04L 65/4053* (2013.01); *G09B 5/10* (2013.01); *G09B 5/12* (2013.01); *G09B 7/00* (2013.01)

(58) Field of Classification Search
CPC ... G09B 7/02; G09B 7/04; G09B 7/08; G09B 5/14
See application file for complete search history.

(56) References Cited

U.S. PATENT DOCUMENTS

| | | | |
|---|---|---|---|
| 8,342,854 B2 * | 1/2013 | Parmer | G09B 7/02 434/350 |
| 2014/0272869 A1 * | 9/2014 | Hambelton | G09B 5/14 434/265 |
| 2019/0385479 A1 * | 12/2019 | Carney | G06F 3/0488 |
| 2020/0394058 A1 * | 12/2020 | Delson | G06F 3/04845 |

* cited by examiner

*Primary Examiner* — Oleg Survillo
*Assistant Examiner* — Christopher P Cadorna
(74) *Attorney, Agent, or Firm* — Quarles & Brady LLP

(57) ABSTRACT

Systems and methods of the present invention provide for receiving, from a client, a request for a collaborative environment; displaying the collaborative environment; recording a plurality of attempt steps including events input by a learner to solve a problem, and solution steps input into the collaborative environment by an instructor, which identifies a timestamp within the plurality of events and generates alternative events solving the problem. The system then receives a request to reproduce the collaborative environment; and generates a reproduction of the collaborative environment.

20 Claims, 10 Drawing Sheets

$$\frac{d}{dx}(e^x \cos x)$$

| | | | | | |
|---|---|---|---|---|---|
| | | | 3.148 × 7 = | | 22.036 |
| | | | 48.53 × 63.4 = | | 3,076.802 |
| | | | 3076 + 93 - 42 = | | 3127 |
| | | | 1234 x 3 - 2468 | | 1,234 |
| DEG | F-E | HYP | M- | MR | MS | M⌄ |
| MC | M+ | | x^y | sin | cos | tan |
| | | | 10^x | log | Exp | Mod |
| | | | CE | C | ⌫ | ÷ |
| ← | π | | 7 | 8 | 9 | × |
| | | | 4 | 5 | 6 | − |
| | n! | | 1 | 2 | 3 | + |
| | ± | | ( | ) | . | = |

FIG. 9

200~# ADAPTIVE COLLABORATIVE REAL-TIME REMOTE REMEDIATION

FIELD OF THE INVENTION

This disclosure relates to the field of systems and methods for use within an online course environment, and specifically to systems and methods configured to provide a collaborative environment in which a learner may present concepts, questions, or problems with which they are struggling, and an instructor may demonstrate, in real or asynchronous time, a solution to the question or problem.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to: receive, from a client, a request for a collaborative environment; display the collaborative environment; record a plurality of attempt steps including events input by a learner to solve a problem, and solution steps input into the collaborative environment by an instructor, which identifies a timestamp within the plurality of events and generates alternative events solving the problem. The system then receives a request to reproduce the collaborative environment; and generates a reproduction of the collaborative environment.

The above features and advantages of the present invention will be better understood from the following detailed description taken in conjunction with the accompanying drawings.

BRIEF DESCRIPTION OF THE DRAWINGS

FIG. 4 illustrates a non-limiting example user interface for adaptive, collaborative real time or asynchronous remote remediation.

FIG. 8 illustrates a non-limiting example user interface for adaptive, collaborative real time or asynchronous remote remediation.

FIG. 9 illustrates a non-limiting example user interface for adaptive, collaborative real time or asynchronous remote remediation.

DETAILED DESCRIPTION

Figure 1:
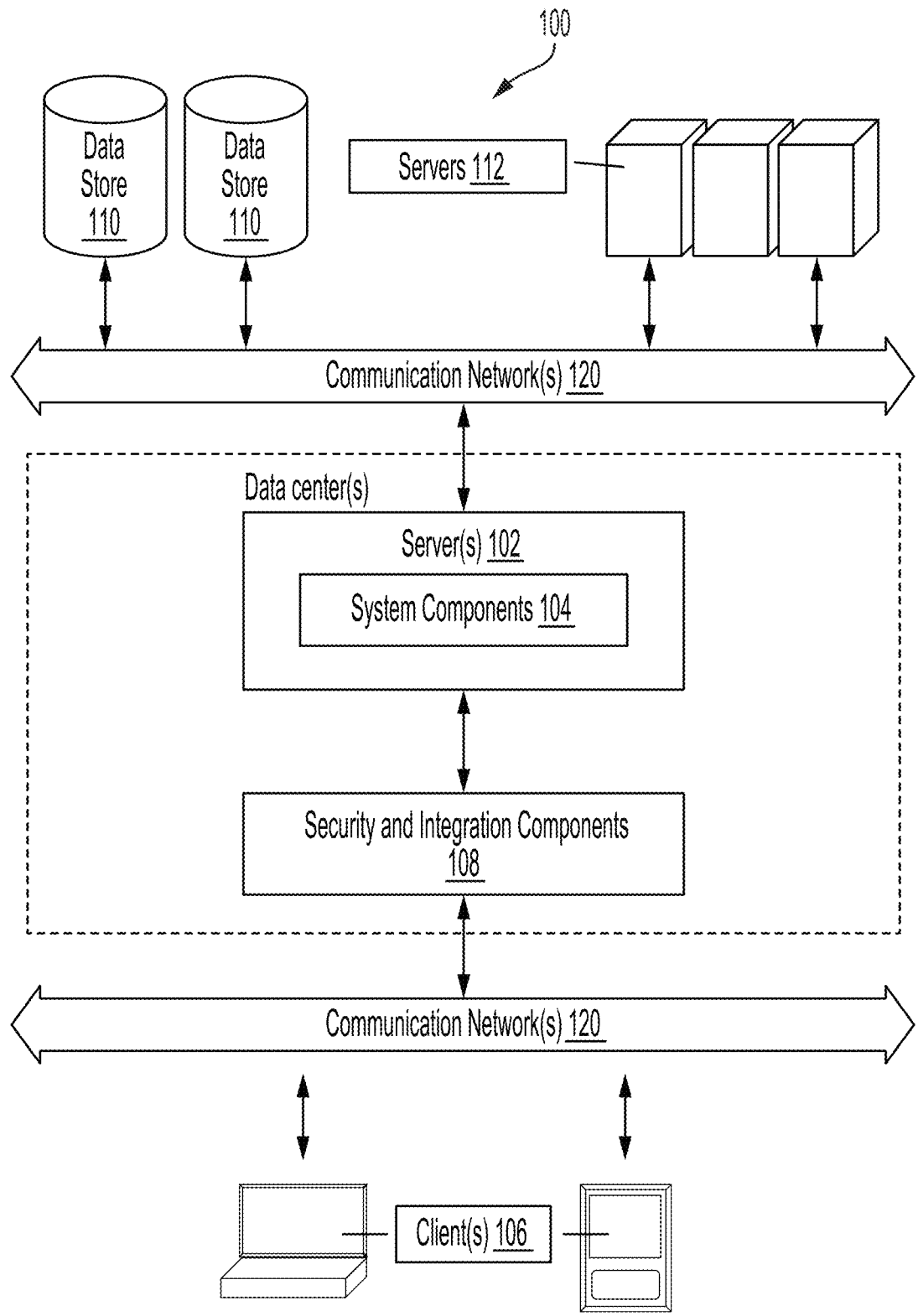
FIG. 1 illustrates a system level block diagram for adaptive, collaborative real time or asynchronous remote remediation.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Traditionally, the classroom experience has included learners and instructors meeting together in a physical classroom. However, more and more, learners and instructors are meeting virtually for class, through the use of online, remote, or virtual classes and the like.

Many instructors note that in such a remote or online environment, concepts and problems where learners become stuck are more difficult to work through. In order to overcome these challenges, some instructors offer remote office hours, so that learners are no longer required to be in person and/or on campus when the instructor is available, thereby avoiding a potential burden and/or a barrier for learners and instructors alike.

However, such remote office hours may present their own unique challenges to instructors. Specifically, the instructors must sometimes be very creative in helping learners in such an environment. For example, instructors may purchase or otherwise acquire remote meeting accounts (e.g., Zoom) so that they can do screen sharing. Nonetheless, these approaches may still not provide an ideal environment to present critical information to learners. Specifically, such approaches may be very one-way in the transfer of information, leaving the learners without critical knowledge.

As more and more of learners elect for remote remediation and as more and more courses become online focused, instructors may lack essential components to create engaging and effective sessions with remote learners offered by modern tools. Additionally, such solutions may require that instructors do significant amounts of preparatory work in order to prepare for such remote learning sessions. The external tools used in such remote learning sessions may lack the ability to provide specific information to address the challenges faced by the learners.

Available remote environments also do not allow instructors to easily work through sample problems, unless the instructor specifically prepared a demonstration prior to the remote learning session. Despite instructors' desire to provide good learning experiences (as demonstrated by the instructors' willingness to attempt to overcome obstacles), learning experiences may therefore be awkward to present, one-sided, and more time-consuming (for instructors and learners that are already pressed for time) than needs be, and may still prevent the instructor from providing remote remediation to their learners.

To overcome these challenges, the disclosed embodiments include a web-based collaborative digital experience where instructors and learners can work through problem areas in student learning. Leveraging learner data and dynamic problem generation, instructors and learners can work through recommended and infinite sample problems based on where the learner is struggling. Using modern digital canvas technologies, the learner and the instructor are able to work together in the same space in real time. These learning sessions can also be recorded and stored so learners can return to the session to review the help at any time. Furthermore, with this technology, instructors will be able to create and share recorded sessions working through problem areas for the class and eliminating the barrier of sharing real time class remediation through digital and online course experiences.

The disclosed embodiments represent a significant improvement over the prior art, as it includes industry leading remediation for asynchronous and real time learner collaboration. The disclosed embodiments further empower learners all over the world to get help any time they need it without being required to be in the same physical time or location as their instructors.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
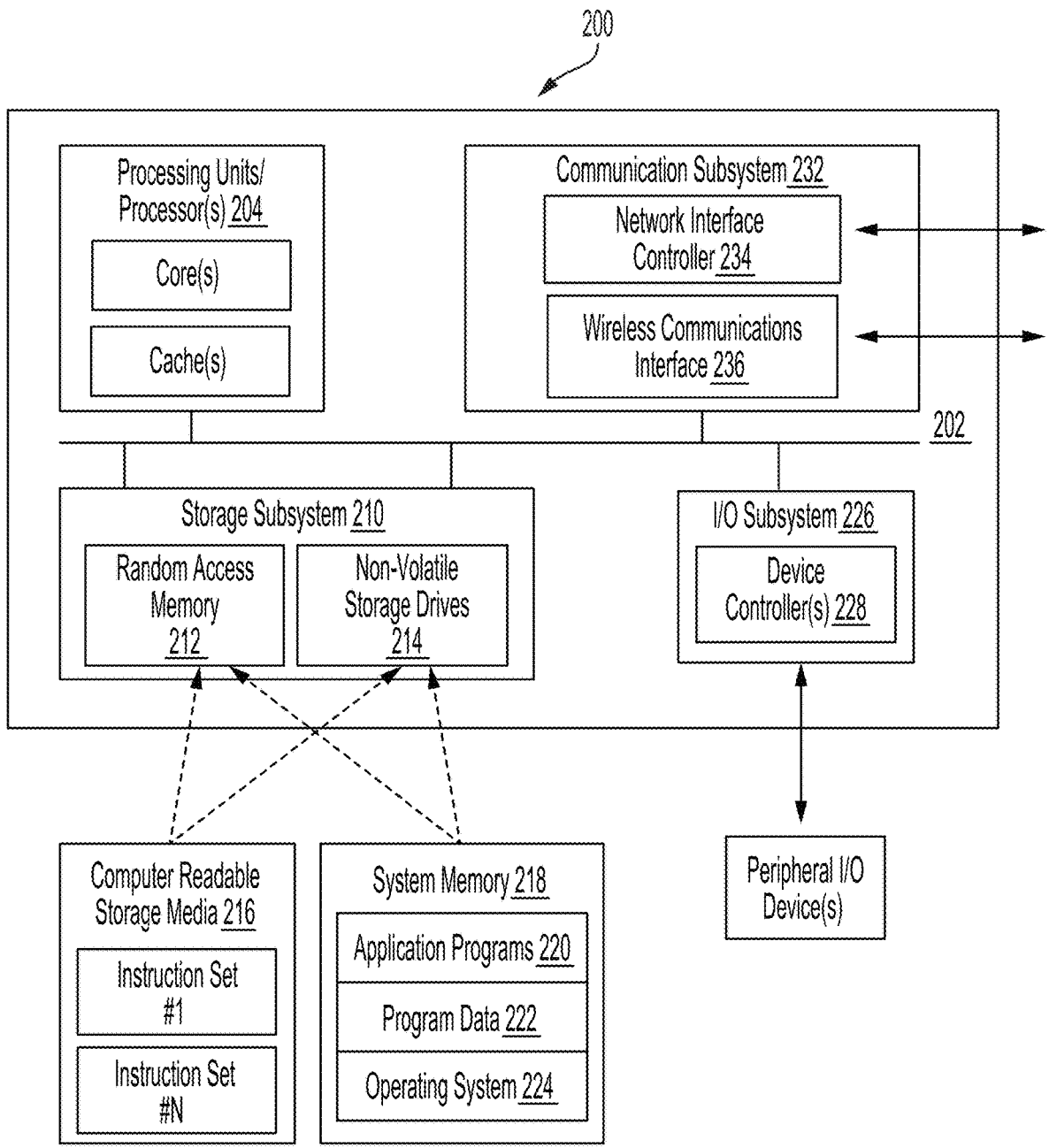
FIG. 2 illustrates a system level block diagram for adaptive, collaborative real time or asynchronous remote remediation.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

As noted above, the disclosed embodiments include a web-based collaborative digital experience where instructors and learners can work through problem areas in student learning. Leveraging learner data and dynamic problem generation, instructors and learners may work through recommended and potentially infinite sample problems based on where the learner is struggling. Using modern digital canvas technologies, the learner and the instructor are able to work together in the same space in real time. These learning sessions may also be recorded and stored so learners can return to the session to review the help at any time. Furthermore, with this technology, instructors may create and share recorded sessions working through problem areas for the class and eliminating the barrier of sharing real time class remediation through digital and online course experiences.

Figure 3:
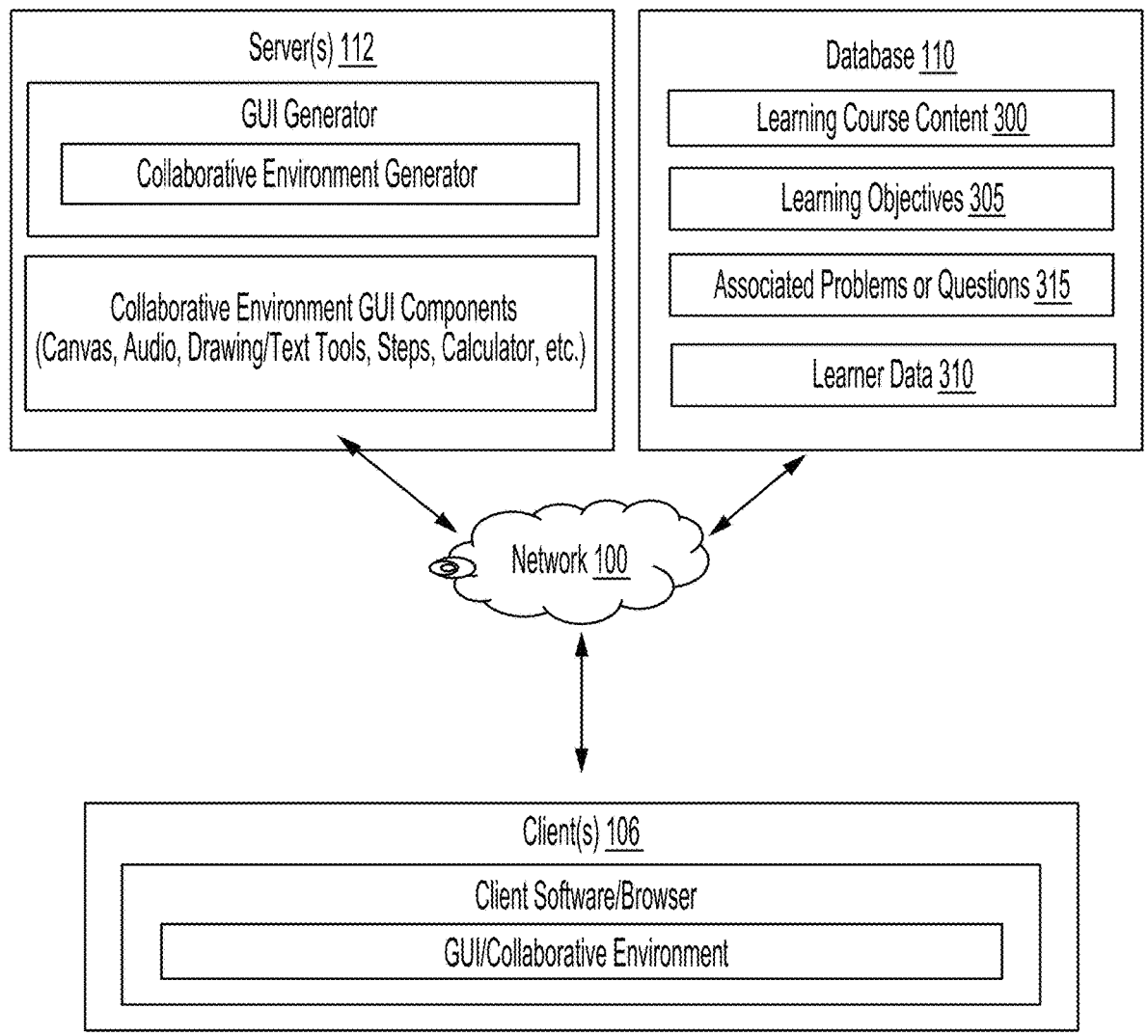
FIG. 3 illustrates a system level block diagram for adaptive, collaborative real time or asynchronous remote remediation.

As seen in FIG. 3, in some embodiments, data store 110 may store content 300 for a class or other learning course. In some embodiments, the disclosed system may define one or more remediation areas associated with the course content 300 and/or for the class itself. Once defined, the disclosed system may store the remediation areas, as defined, within data store 110.

In some embodiments, users, such as system administrators, course creators, instructors, etc. may identify one or more learning objectives 305 associated with the remediation areas in the class content 300 or learning course, and may input these learning objectives 305 into the system, possibly via user input into a graphical user interface (GUI) displayed on one or more client devices 106

The disclosed system, possibly server 112 may receive the user input, and define one or more remediation areas associated with the course content and/or for the class itself. Once defined, the disclosed system may store the remediation areas, as defined, within data store 110.

Data store 110 may further store a plurality of data 310 about each of one or more learners, possibly enrolled in a class or an organization, and stored as a learner profile for each of the learners. In some embodiments, this data, at a high level, may derive data from a high level for a plurality dimensions and characteristics associated with each of the learners. In some embodiments, these dimensions may define things that the learner may be struggling with. By using this data, the disclosed system may provide a baseline of knowledge about the user (i.e., not starting from zero), to better identify their struggles.

As non-limiting examples, this data 310 regarding each learner may include data derived from, for example, problems within homework, assessments, and/or other assignments. In some embodiments, this data may include content from a previous assignment or assessment submitted by the learner. In some embodiments, this data may include identification of problems or questions for which the learner has requested help, possibly associated in data store 110 with the previous assignment or assessment. In some embodiments, this data may include additional data derived by determining a learner's interactions and/or results associated with one or more learning objectives 305 stored in the data store 110.

The disclosed system may provide assistance for learners that are struggling with a concept or a specific problem, and may further provide a remote collaboration between learners and instructors. This may occur in at least two ways. A first approach may allow a learner to request assistance asynchronously, separate from the online class (for example), being able to request assistance at any time. Another approach may allow a learner to request assistance during an online class, and the learner and instructor may review concepts associated with the problematic question or problem during class time, so that the review becomes a part of the class, for example. This approach may allow additional learners in the online class to benefit from the review of the problem.

Figure 4:
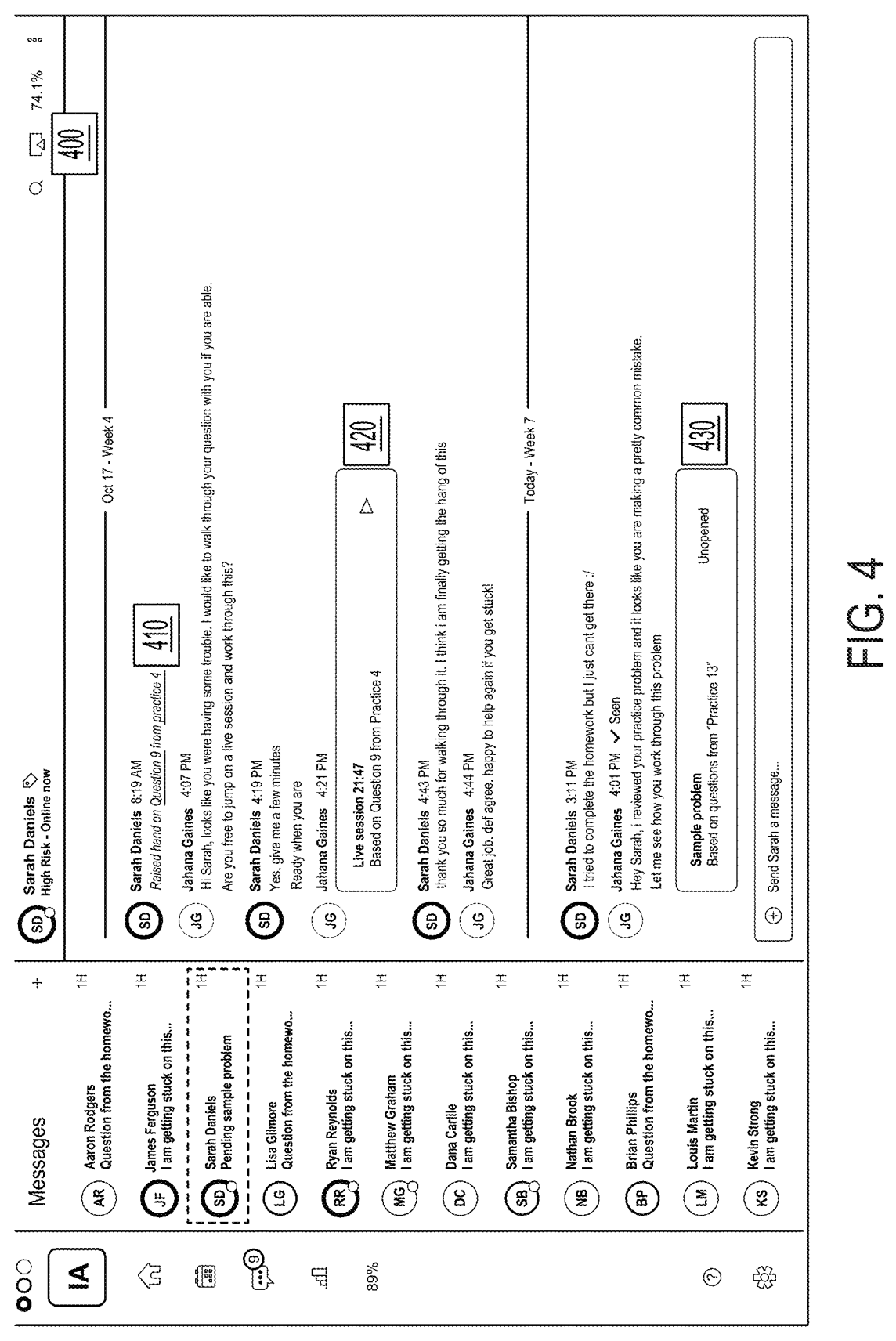

In the real-time embodiments discussed above, the instructor may present the content 300, possibly the content 300 stored in data store 110. As the instructor presents the content 300, possibly during an online class, a learner may recognize that they are stuck on a particular concept, question, problem, etc., realizing that they don't understand a particular concept, for example. The learner may therefore select a button to request a remediation for a concept taught or a question or problem presented, as seen in FIG. 4.

Figure 8:
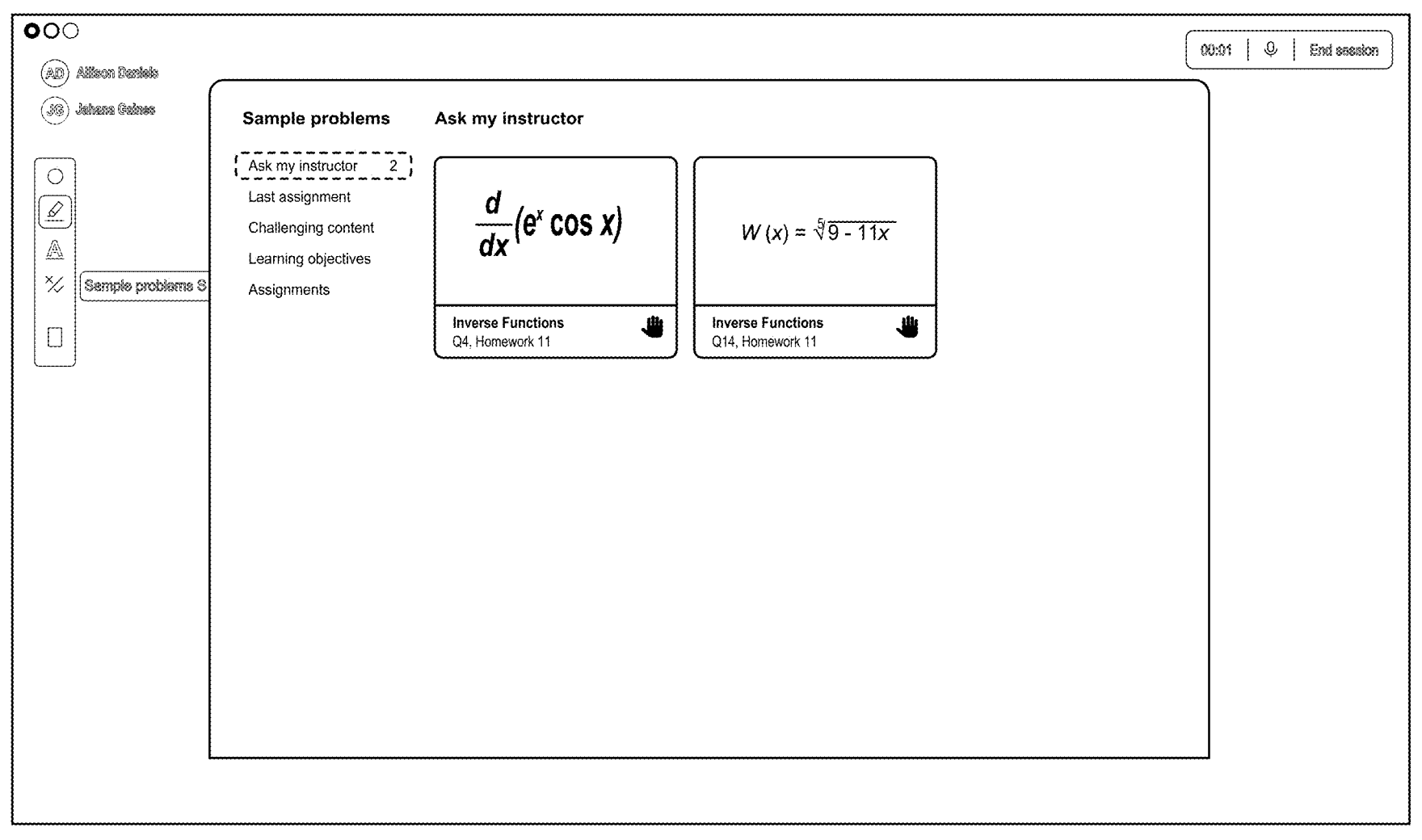

Thus, the disclosed system may include an "Ask my instructor" button (also demonstrated in FIG. 8), so that as learners struggle on homework or practice, they may select this button. In response, the system may pre-populate a collaborative "room," described below, that is pre-set to work through the exact problem area a learner is struggling with.

This may allow the instructor to identify concepts, questions, and/or problems that a learner may be struggling with (which is often difficult for instructors to identify), and provide the learner with at least one problem (and preferably more, if needed) and work together to solve one or more problems together.

By providing such a collaborative work environment, the instructor may provide a starting point for a problem that has been identified as keeping learners in the class from progressing. Likewise, learners who would not typically have asked questions about a concept or problem, etc. may benefit from those that are willing to ask for additional assistance.

Similarly, by working through multiple problems together, the instructor may avoid situations in which the example problem may be oversimplified, and the learners may benefit from more and varied concepts, questions/answers and/or problems. By creating additional concepts, questions, or problem options, the learners receive greater instruction towards understanding the underlying principles of the concepts or problems, rather than just solving one specific problem.

Figure 5:
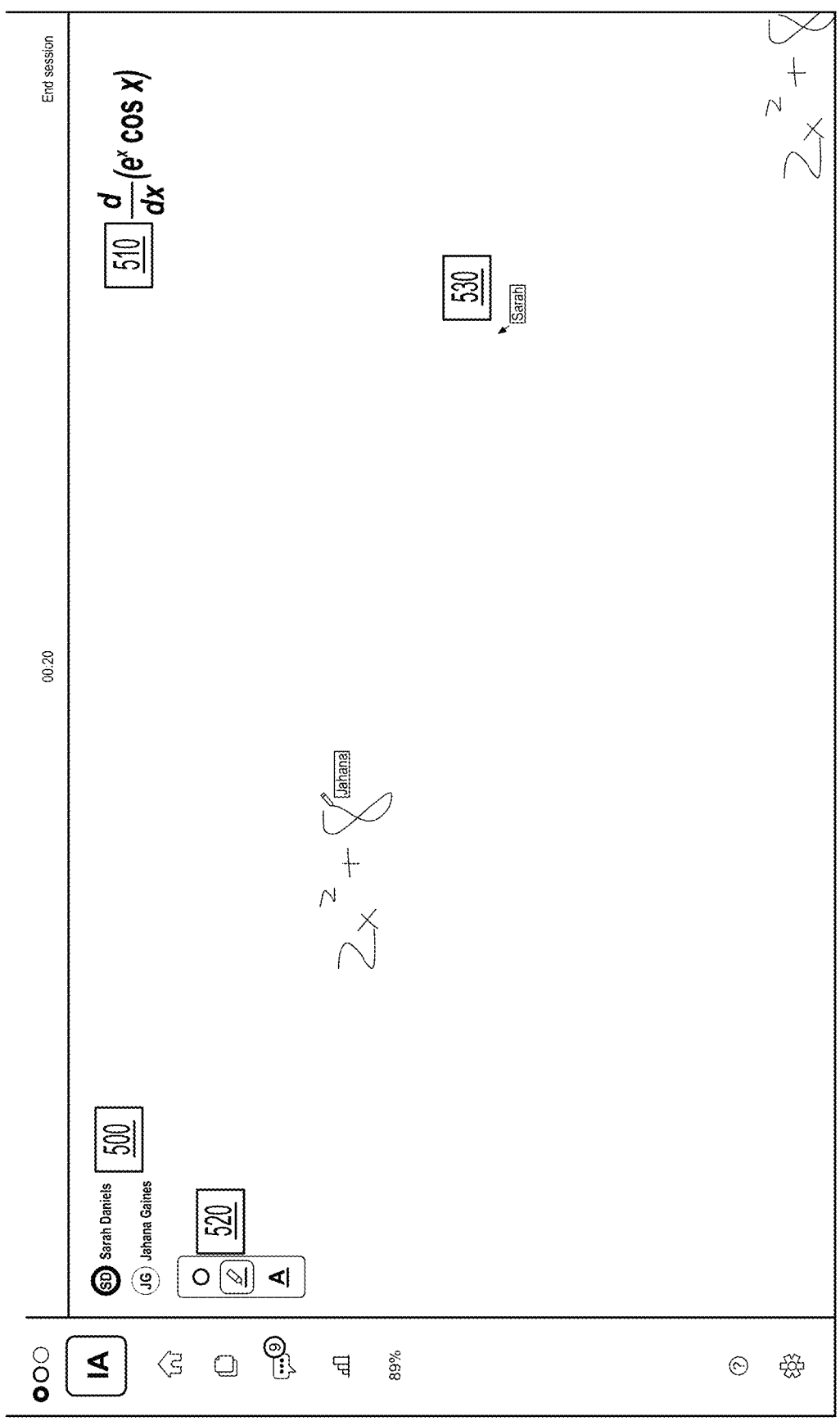
FIG. 5 illustrates a non-limiting example user interface for adaptive, collaborative real time or asynchronous remote remediation.
Figure 6:
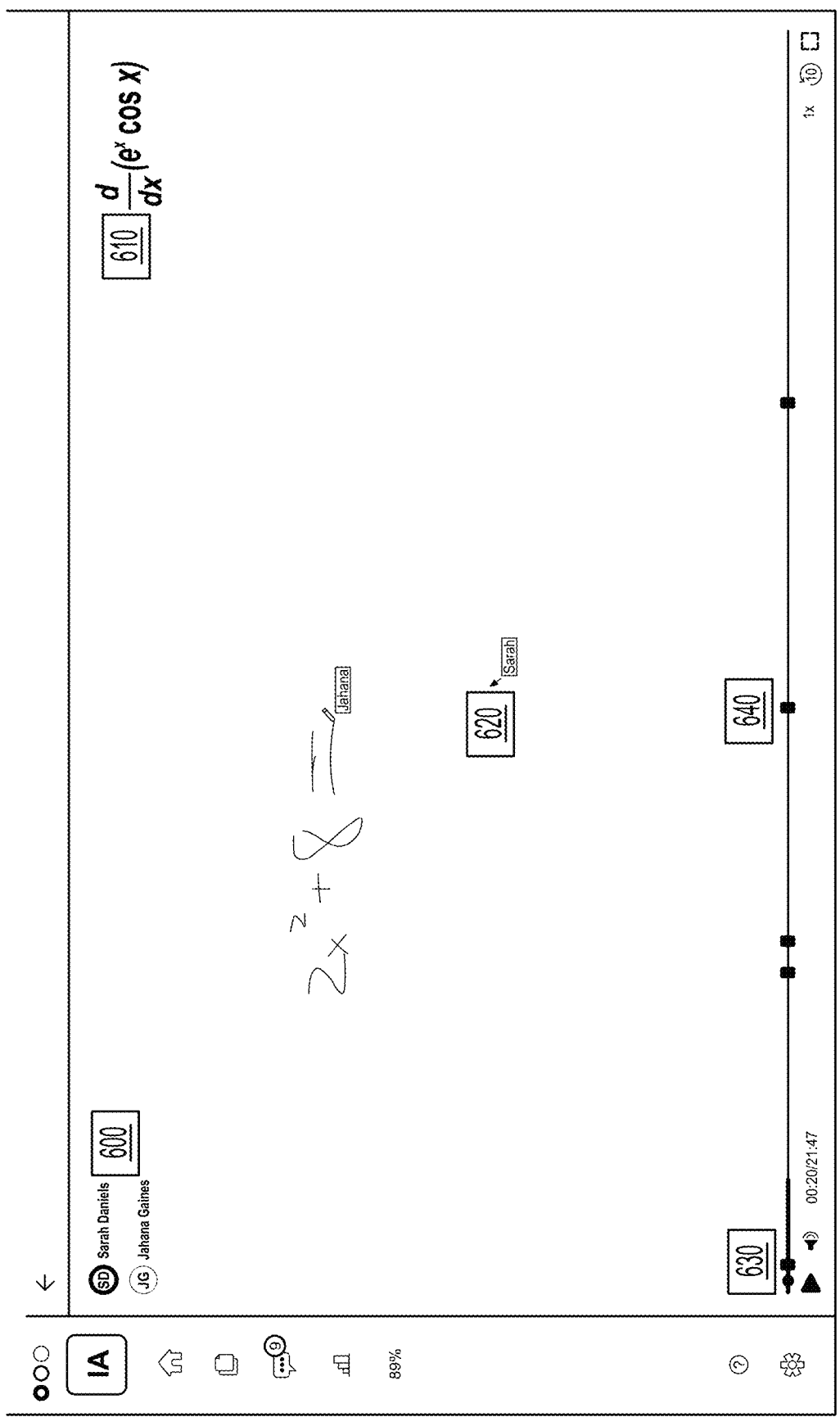
FIG. 6 illustrates a non-limiting example user interface for adaptive, collaborative real time or asynchronous remote remediation.

As a non-limiting example, in FIGS. 4-6, during a discussion with an online class, a learner named "Sarah" may requests assistance from the instructor, because she is not mastering a concept or problem being discussed in class and may want to walk through it, and the instructor may recommend a remote session to collaborate in real time for both Sarah's benefit, and the benefit of the entire class.

A learner (Sarah in FIGS. 4-6, and Allison in FIGS. 7-9) may therefore select a button for starting a collaborative session (e.g., "Ask my instructor") from within the user interface. The system may then direct the GUI to display (possibly as a superimposed or integrated GUI), a shared canvas space, in which the instructor and the learner (and any additional learners, in some embodiments) may collaborate to solve the problem to better understand the concepts and/or principles, and answer any outstanding questions.

In some embodiments, while the system or the instructor prepares this shared canvas space, the system may present one or more screens that act as a sort of virtual waiting room for the learner(s).

The system may then connect the instructor, the learner, and any additional learners (e.g., from a class), who are all then able to access the collaborative environment.

In some embodiments, the connection between the instructor and one or more learners may be associated with a specific device for the instructor and a device for each of the learners, and each of the devices may then display each user's interaction in real time.

A walkthrough of the functionality associated with collaboration environment is described below. In some embodiments, in response to the learner selecting the button for the collaborative environment, the system may provide the working area, and real time voice synchronization, both of which will be described in more detail below. In some embodiments, this collaborative environment may include modern web canvas technology in combination with real time voice communications.

This collaborative environment may allow instructors (or learners), via a single click, to initiate a digital collaborative working space where both one or many learners and the instructor are able to manipulate the environment together in real time, possibly via cursors (e.g., colored cursors) for each participant, used to navigate the various components of the collaborative environment, described in more detail below.

Continuing the example with Sarah above, the instructor and Sarah may both be able to see the collaborative environment together and be able to work in the same space. As an example, the instructor may request that Sarah demonstrate how she would attempt to solve the problem, and Sarah may provide her attempt to solve the available problem. Both the instructor and Sarah's cursors would be visible and available for the entire class to see, and their voices would be available to hear, so that the instructor and other learners in the class would be able to recognize where Sarah becomes stuck, and be able to walk her through a correct solution to the problem, using the tools described below, such as the described canvas and audio instructions.

The collaborative environment may therefore include a plurality of tools within a toolset, allowing the users (instructors and learners) to free draw on the canvas, while explaining their actions via voice connection and instruction. For example, as described in more detail below, in some embodiments, users may use their mouse cursor (or touch if on a touch enabled device like phone, tablet, or touchscreen laptop) to draw freely to work through concepts, problems, questions and answers, etc. In other embodiments (e.g., those that leverage an assessment engine), users may also activate and use a math based keyboard to place text into the canvas. Users may then draw freely over the plain text to continue explaining and work through solutions, cross out parts that they are done with, circle key parts, etc.

In some embodiments, a mouse for each user (e.g., the instructor and multiple learners) may be actively moving on the screen, and the GUI for the collaborative environment may display each user's movement on the screen. These cursors may be used to navigate the collaborative environment described herein.

In some embodiments, users may also use their mouse to access a "draw mode" to be able to draw or otherwise write on the canvas. In some embodiments, this draw mode may include additional options allowing the user to select additional colors, being able to change colors for the "pencils" that are used to draw or write on the page As noted above, users may further access a text mode, allowing them to select an area and add text, possibly via a text area, to the canvas. The user may then type out desired solutions, questions, comments, etc.

In some embodiments, the canvas may be considered infinite, meaning that the working area of the canvas can be expanded as needed. In other words, within the canvas created to explore the concept, problem, solution, question, answer, comments, etc., instructors and learners may have access to a virtual working space within the environment, similar to a virtual whiteboard that, in theory, may grow infinitely in any direction, according to the needs of the users, so that they never run out of space and so that the work can grow organically.

In real-time embodiments (or in asynchronous embodiments described below), the concept, question, problem, etc. with which the learner is struggling may be imported into the canvas. In some embodiments (or to reinforce the concepts and principles associated with the problem and/or question provided by the learner), additional problems may be provided to reinforce the concept.

Continuing the example above, the instructor may note that Sarah has a question from a homework assignment or discussion within the online class, possibly regarding inverse functions for example. The instructor may then determine that this is the question that needs to be addressed. The disclosed system may therefore provide means to import the problem or question into the provided canvas area.

In some embodiments, the disclosed system may have access to a third party digital learning environment, which may include any combination of tools, with capabilities to import a problem or question that the learner is currently working on. In some embodiments, the question or problem may be imported by selecting a single displayed button.

In some embodiments, the learner may create a digital representation of the problem. For example, if a user didn't want to have to redraw the problem that they had started, they may scan, take a picture of, and/or use other photo recognition technology known in the art on a paper or whiteboard, for example, on which they have been working on the problem. The user may then request a next step, in order to avoid redrawing it, and upload the scanned image, and possibly the data derived from such an image (as well as a request for instruction and next steps), into the canvas.

Once uploaded, in some embodiments, the disclosed system may allow a user to draw a box around the problem, or specific parts of the problem, in order to define the problem, or a portion of the problem, that the user/learner would like solved. There could be extensibility around several aspects of the drawing capture elements described above.

In some embodiments, the disclosed system may auto-generate problem sets, providing an improvement over prior art systems. For example, in some embodiments, explored in more detail below, after selecting the button to access the collaboration workspace, the system may automatically generate one or more problems or problem sets based on the problem submitted by the user. These problem sets may be based on a learning objective to be achieved by the problem. In some embodiments, the generated problems or problem sets may be customized to the learner, based on the learner's history, according to the user profile data stored in data store 110, described above. The disclosed system may generate as many problems as needed to demonstrate the concepts that must be mastered for the identified learning objective for the learner.

In other words, the disclosed system may receive a first problem from a learner, or may auto-generate a first question according to the concept or learning objective identified (e.g., a concept being discussed in an online class environment). The instructor and learner may review the first problem/question and may desire to see a different instance of a similar problem or question. The disclosed system may identify data associated with the first question, such as the learning objective for the first problem/question and/or data within the user's profile indicating that the learner struggles with similar or prerequisites to the learning objective, and generate new, but similar, problems or questions to ensure that the learner has mastered the concepts needed for this learning objective.

The system may then generate and display such problems or questions within the collaboration environment, and the instructor and learner can work through as many problems or questions needed to master the concepts or learning objectives needed.

In order to customize the generated problems to the learner, as noted above, the disclosed technology may select, from data store 110, profile and use history data stored in association with the learner that requested the collaborative environment for a specific concept, problem, or question. The disclosed system may then analyze the data associated with the learner to determine a problem or question to automatically generate.

As a non-limiting example, if the learner has asked for help on two previous problems or questions, possibly related to the current problem or question, or prerequisite concepts or problems to the current problem or question, the current problem or question may be generated or selected based on the problems that have been identified in the previous or prerequisite problems or questions, thereby providing an opportunity to address possible underlying issues that need to be resolved, specifically for that learner. In some embodiments, the system may identify the previous or prerequisite problems or questions, and re-present them, possibly including steps taken by the learner that were incorrect and/or a corrected series of steps by the instructor in order to review the steps needed to achieve the learning objective and its prerequisites.

In some embodiments, the system may identify, from the user's questions, a current level of understanding by the user. Based on this level of understanding, the system may identify the user's level, provide questions or problems equivalent to the user's current level, and recommend questions or problems that will target the user's understanding, then continue to provide progressive questions or problems, increasing in complexity, which will improve the user's skills to overcome the user's questions or concerns.

Another dimension that the disclosed system may consider in automatically generating and/or selecting one or more additional problems or questions is the learning objective to be achieved. In these embodiments, the disclosed system may select and analyze data in data store 110 associated with the learning objective 305 in order to determine whether all aspects or dimensions of the learning objective 305 have been explored, and if not, continue generating problems or questions associated with the learning objective 305 until all aspects or dimensions of the learning objective 305 have been explored and are complete.

In short, the system may generate, in response to requests from learners and/or instructors, as many problems or questions as needed for the learner to understand concepts needed for problems or questions, and may continue to generate such problems or questions until all aspects and dimensions of a learning objective have been explored, and the learner has mastered these learning objectives. In some embodiments, the instructor may select to create another problem, and may be provided options to determine which aspects or dimensions of the learning objective are explored, and/or may select more and more challenging problems or questions in order to improve the learner's understanding of the underlying concepts or skills required.

The labeled elements of FIGS. 4-6 may highlight and augment the tools available in the collaborative environment, as described in detail herein. In FIG. 4, element 400 demonstrates an instant learning session feature, including a one-click "go live" button, with which a user, such as a learner or instructor initiates a collaborative online session. Element 410 demonstrates a pre-seeded learning session, including a context from an assignment where a learner requested help sets, which focus of the next collaborative learning session. Element 420 demonstrates a recorded session playback, wherein, if the session was chosen to be recorded, the learner and instructor may enter the previous session and play it back. Element 430 demonstrates asynchronous sessions, wherein an instructor may open their own session and choose to provide voice and illustrative feedback for learners to review to answer questions when it works for the instructor.

In FIG. 5, elements 500 and 510 demonstrate who is talking, specifically demonstrating participant voice activity shown in real time, which indicates when user is talking by alternating opacity as participants speak. Element 520 demonstrates non-limiting examples of collaborative tools, which users may access to free draw within the canvas, using a tablet mouse or finger, for example, depending on the device. Participants may also choose to add text and math values via an available math keyboard (in some embodiments) if they do not wish to draw it all out. In some embodiments, the collaborative tools may give users access to various colors while drawing to further get their messages across. Element 530 demonstrates a non-limiting example of real-time movement, wherein each participant may have a cursor on the canvas with a corresponding color and name that matches the participant list. In these embodiments, all movements and creations may be shown in real time. FIG. 5 further demonstrates an infinite canvas wherein, in some embodiments, by grabbing and dragging, users may move across an infinite canvas and working area as if it was one large white board working space.

In FIG. 6, element 600 demonstrates who is talking, by showing users' voice activity from the session, and will indicate when a particular user is talking by alternating opacity as participants speak. Element 610 demonstrates a suggested auto-generated problem, wherein the disclosed system provides a sample problem to work through, based on learner data. In some embodiments, the instructor may click on the problem to generate another sample problem. Element 620 demonstrates entire session playback wherein, in some embodiments, cursors are matched to participants and playback shows all cursor movements and creations from the session. Element 630 demonstrates playback controls available in some embodiments, wherein users are able to scrub a video session as if it were a video. In at least some of these embodiments, playback is actually UI elements moving on screen and not a traditional encoded video.

Element 640 demonstrates new problem callouts available in some embodiments, wherein every time a new problem is generated and worked on, a flag will be added to the playback timeline for easy jumping to key parts of the learning session. FIG. 6 further demonstrates full scalable vector graphics (SVG) capture, available in some embodiments, wherein recorded sessions are configured to playback the actual SVG elements that are being moved and not a video replay. This allows for more fluid playback as it is not a video, but instead the actual interface moving. This also makes playback files very small and increases accessibility.

Once the instructor and learner are connected within the collaborative environment, have accessed the tools within the environment, and have been presented with the first or subsequent problems or questions, the instructor and learner may collaborate to work through the necessary concepts, ideas, learning objectives, characteristics, dimensions, etc. of the problem presented, which may be captured to be shared with additional learners for their benefit (e.g., allowing them to observe the thought process used to solve a problem), as described below.

Figure 7:
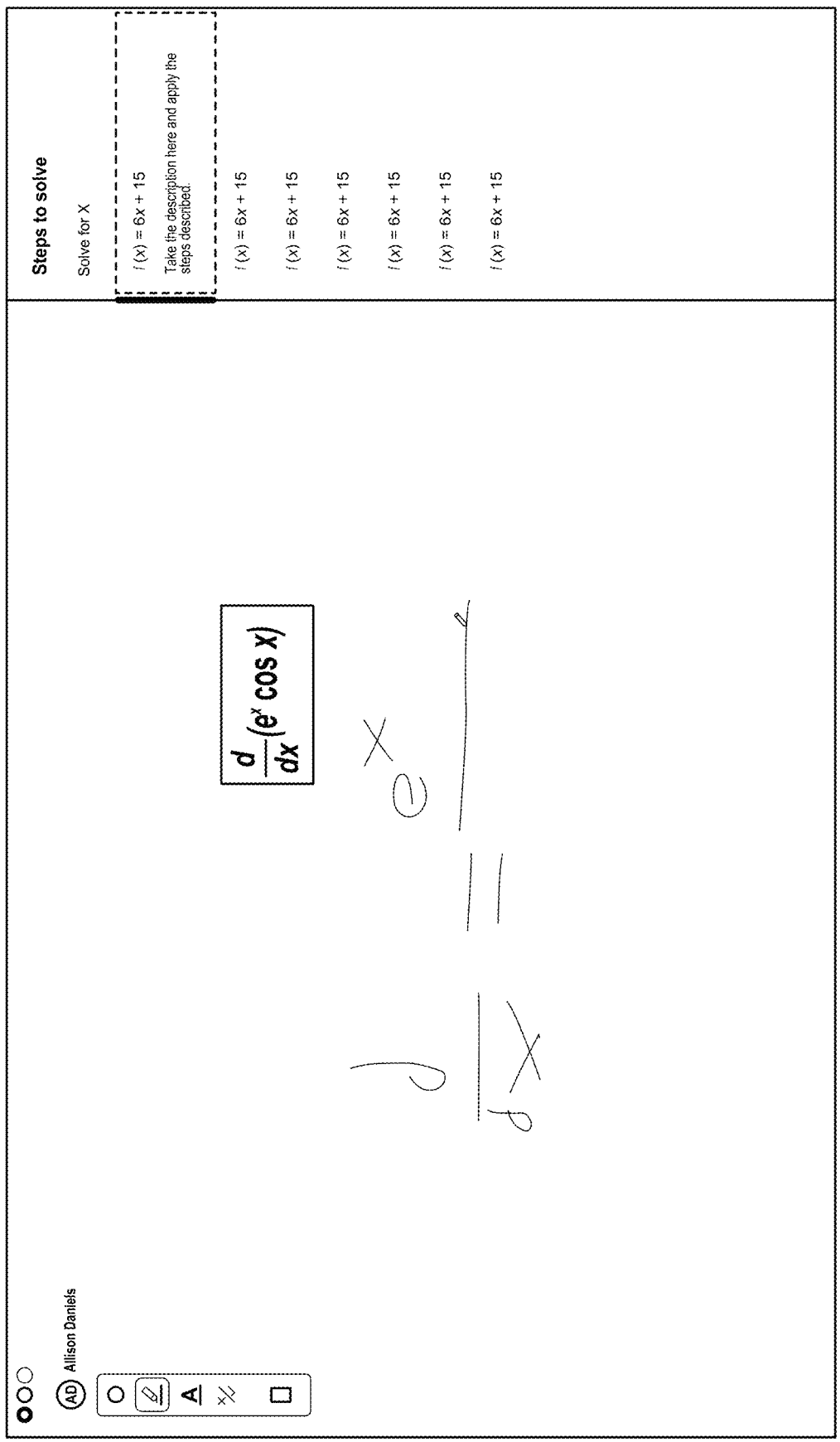
FIG. 7 illustrates a non-limiting example user interface for adaptive, collaborative real time or asynchronous remote remediation.

In some embodiments, such as that seen in FIGS. 4-9, subsequent users (e.g., other learners in the online class) may select a button or link on a shared screen or common canvas, where one or more instructors or learners may view, in order to review how the problem or question was solved. In FIG. 7, once this button or link is clicked, the system may generate and display a sidebar or popup on the GUI including a series of steps showing how the problem or question was solved. In some embodiments, such a sidebar or popup may identify a point at which another learner has stopped, and instruct them on additional steps that need to be completed to solve the problem or question.

In some embodiments, such as that seen in FIG. 9, the shared collaborative canvas may include a shared calculator, which may be displayed as a sidebar or popup window. Users may access this shared calculator in situations where the user is less interested in the steps to solve the problem or question, and more interested in how to insert these steps into the shared calculator, in order to understand how the steps are applied when entering them into the calculator. In these embodiments, the instructor and learner may both be able to view the calculator.

In the non-limiting example seen in FIG. 9, a user Allison may be typing steps from the problem into the calculator and so that the instructor may identify the problem, such as necessity to do a sin first, then identify the missed understanding.

The disclosed system may record the session within the collaborative environment. In some embodiments, rather than being video based, the disclosed system may record all movements and canvas elements, voice, movements, manipulation of canvas or other environment elements, etc.

As noted above, in some embodiments, these events may be recorded by capturing mouse movements, coordinates (e.g., x, y coordinates), text placements, etc. as SVG files, synchronized with audio files (possibly compressed audio files such as MP3) captured from the shared session. As noted above, in these embodiments, the captured SVG data and compressed audio files may be much smaller than a captured video/audio file, such as a movie file. In other words, since this is not video based and is only voice and canvas manipulation, the system may record all movements and canvas elements to be able to be played back at any time.

However, such SVG embodiments are not just replaying a video, but are, in fact, replaying the items that were manipulated within the canvas, thereby improving the size, performance, and other complicated video issues created by recorded video files. To accomplish this, the disclosed system may store vector data for graphics, and be able to play that back as an animation, synchronized and associated with specific times and times within an audio file (as disclosed below). Playing back the animation may include using the x and y coordinates to show positions on the canvas or environment from the start to the end of the recorded session.

The record of the actions taken within the environment or canvas may further be synchronized to the audio created in association with the session. As noted above, the instructor and learner may establish an audio connection for the session, and the audio may be recorded, and synchronized to various timestamps recorded in the SVG recording, so that certain animations occur at the time that the event is described in the captured audio.

The playback of the events, and the captured audio may therefore be mapped and synchronized according to timestamps within the session. For example, in some embodiments, every time a new problem set it created, a timestamp is added to the playback for easy navigation on replay making it easier for learners and educators to refer back to a key area from longer sessions. In some embodiments, the mapping of the events and audio track to various timestamps may be accomplished via a real time, "multi player" mouse movement capture engine, as is known in the art.

Thus, one of the improvements of the disclosed embodiments over the prior art is the ability to duplicate and play back any collaboration session to review the steps taken to solve a problem or question, and better understand the underlying concepts and principles.

As previously noted, the collaborative sessions may be applied in both a real time (e.g., during an online class), or asynchronous (e.g., a learner has a question during non-class time). For example in real-time scenarios, once the online class-wide instruction, including the recordings of collaborative sessions using the collaborative canvas individually to work through problems while explaining them, are complete, and the session is recorded, the instructor may share the recorded session as part of the instruction for the class. This recording can also become part of the material used in future classes.

However, the features of collaborative sessions described above are not limited to a real-time, classroom environment. In some embodiments, such collaborative sessions may allow instructors and learners to work through any ongoing problems asynchronously, allowing the learner to request such a session at any time.

As a non-limiting example, a learner may have a question during an evening or weekend, before a homework assignment or quiz/test is due, or the like. The disclosed embodiments provide an opportunity for the learner to select a button or link (such as the "Ask my instructor" link in FIG. 8), and submit the question or problem that they are struggling with. Once the instructor and learner are connected, they may solve problems or questions, and the system may record the collaboration session, as described in detail above.

In both the real time and asynchronous embodiments described above, the disclosed system may record and store the work completed by the learner, as well as any audio commentary captured by the learner, voicing their thought process, and any concerns they have with a concept, problem, question, etc. The recording may further allow the user to show or otherwise indicate, by audio or actions, where they're struggling. In asynchronous embodiments, the learner may then send a recording of a session to the instructor to get feedback.

In other words, in both real-time and asynchronous sharing environments, individuals may work through issues they are having while vocalizing their thought process and issues they are having. These learners may then send the recording off to the instructor for review.

The system may then store the learner's attempt, possibly in data store 110. Once the user's attempt has been stored in data store 110, the instructor may review the learner's attempt, immediately in real time embodiments, and at any time in asynchronous embodiments.

In response, the instructor may then analyze the learner's attempt at solving the problem or question, identify steps during which the learner attempted to solve the problem or question incorrectly, and provide feedback of how these steps are to be overcome, by providing a correct path or set of steps to a correct solution. The instructor may then record and store this solution, including the corrected steps, as disclosed in detail above, and the disclosed system may then provide both a recording of the original attempt by the learner, and a recording of the corrected solution by the instructor, to both the learner and possibly to additional learners within the class.

The instructor may then respond to the video with another video, including the same problem from the request, and work through it while vocalizing and addressing learner concerns. The instructor may then send feedback to the learner.

In both real time and asynchronous embodiments, the recording of the collaborative session allows users to review, long after the session has taken place, in order to remember the steps required to accomplish the learning objectives discussed, and review the real-time work that they have completed, and all that they have reviewed with the instructor, including voice recordings. In some embodiments, the playback of the recording may include a play scrubber, allowing the user to navigate to various times within the recording.

In embodiments in which the learner records their attempt to solve the problem or question, and the instructor provides a recording of their corrections to the learner's attempt, the instructor may play through the learner's original recording, pause the recording, and create a second branch of the recording, in which the instructor edits the user's attempt to include the correct solution and each of the correct steps required to solve the problem or question.

The use of the SVG recording of events and audio, as described in detail above, creates a series of events and audio tied to specific time stamps, thereby allowing the instructor to create an entirely different series of events, audio, and timestamps that exist on one or more branches separate from the originally recorded events, audio, and timestamps.

Thus, once the instructor pauses the original recording (possibly selecting a button or link marked "Reply as instructor"), the instructor may alter the state of the events at that time stamp in order to edit (i.e., add to) the events within the recording. To accomplish this, the instructor may pause the recording playback, select the appropriate button, re-draw events within the session beginning at a starting point at the timestamp, and include additional audio, synchronized to the original session, and/or as a separate branch from the original session, to dynamically draw new events, or re-draw events that have previously happened on the screen. (i.e., in this world when the user hits pause, and chose "add a reply as an instructor," the instructor reply would start at that moment in time with what's on their board, and be able to fix that issue starting at this point). These dynamically created events may be recorded and stored in association with the original session, as described in more detail above.

Thus, the instructor may either create a completely new recording, or create two separate recordings, a first of which includes the learner incorrectly attempting to solve the problem, and a second recording in which the instructor corrects the learner's attempt to solve the problem or question correctly.

Continuing the example above, the instructor may watch Sarah attempt to solve a problem, pause the recording at each point at which Sarah proceeds in an incorrect direction in attempting to solve the problem, and diverge and create a new timeline, in which the instructor solves the problem correctly.

The instructor, the learner, and/or any additional learners in the class may therefore see the learners' initial work, and at any of the branches, may further see the instructor's work/corrections to identify where the original learner moved in a wrong direction.

Thus, the users could observe both the learner's original content, and the instructor's new content. In other words, there would be an original source file generated by the original learner, as well as one or more points where the instructor paused the playback and generated a reply, thereby creating a secondary file including the response from the instructors. The disclosed system therefore keeps the original full file of events from the learner, as well as the instructor's responses.

As noted above, the response by the instructor may include talking through/vocalizing what is seen in the video and send it back to the class, creating a relationship between the original question and problem and the instructor's response.

In some embodiments, the disclosed system may use data capture, using the problem sets generated, in order to leverage the data to continue to build out and improve available learning analytics, which may better define what challenging content is understood and which the learners are struggling with.

These embodiments may map and leverage learning and engagement data gathered from learners and instructors who use the tool to determine if the learners or instructors that participate in collaborative learning sessions results in better learning outcomes, particularly related to online course offerings.

Figure 10:
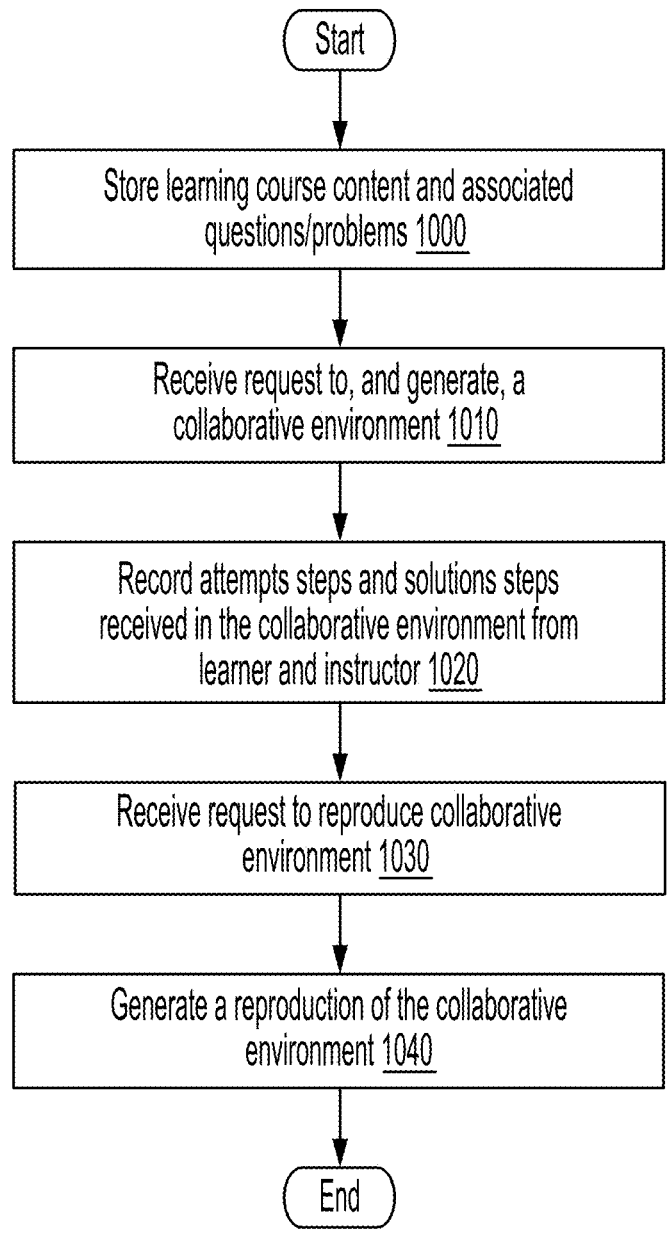
FIG. 10 illustrates a non-limiting example flow chart for adaptive, collaborative real time or asynchronous remote remediation.

In summary, as seen in FIG. 10, the disclosed embodiments may include a system comprising a database coupled to a network and a server coupled to the network and comprising a computing device comprising at least one processor executing instructions within a memory. The server may be configured to: store, within the database, a learning course content and a plurality of problems or questions associated with the learning course content (Step 1000). The server may be further configured to: receive, from a graphical user interface (GUI) displayed on a learner client device, a request to generate a collaborative environment; generate, for display within the GUI, the collaborative environment (Step 1010); record, from the collaborative environment: a plurality of attempt steps input into the collaborative environment using the learner client device, the plurality of attempt steps comprising a plurality of events input by a learner in an attempt to solve a problem or question in the plurality of problems or questions; and at least one solution step input into the collaborative environment using an instructor client device, wherein the at least one solution step: identifies a timestamp within the plurality of events; and generates an alternative plurality of events solving the problem or question (Step 1020); receive, from the learner client device, or a second learner client device, a request to reproduce the collaborative environment (Step 1030); and generate, for display on the client device or the second client device, a reproduction of the collaborative environment (Step 1040).

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:
1. A method comprising:
storing, by a server including a computing device coupled to a network and including at least one processor executing instructions within a memory, within a database coupled to the network:
a learning course content; and
a plurality of problems or questions associated with the learning course content;
receiving, by the server, from a graphical user interface (GUI) displayed on a first learner client device, a first request to generate a collaborative environment including a shared canvas space, wherein the collaborative environment is configured to be manipulated by both the first learner client device and an instructor client device in an asynchronous manner and a real time manner and wherein manipulation of the collaborative environment includes modification of a canvas element of the shared canvas space by one or both of the first learner client device and the instructor device;
generating, by the server, for display within the GUI, the collaborative environment;
recording, by the server, as a collaboration session, from the collaborative environment:
a plurality of attempt steps input into the shared canvas space of the collaborative environment using the learner client device, the plurality of attempt steps including a plurality of events provided within the collaborative environment by a learner attempting to solve a problem or question in the plurality of problems or questions; and
at least one solution step input into the collaborative environment using the instructor client device in response to at least one of the plurality of attempt steps, wherein the at least one solution step:
identifies a timestamp within the plurality of events; and
generates an alternative plurality of events solving the problem or question;
receiving, by the server, from the first learner client device or a second learner client device, a second request to reproduce the recorded collaborative environment; and generating, by the server, for display on the first learner client device or the second learner client device, a reproduction of the recorded collaborative environment.

2. The method of claim 1, further comprising the steps of:
receiving, by the server, the first request from the first learner client device during an online class;
generating, by the server, for display on a plurality of learner client devices associated with the online class, the collaborative environment; and
transmitting, by the server, the collaborative environment to the plurality of learner client devices for display in real time.

3. The method of claim 1, further comprising the steps of:
receiving, by the server, from the first learner client device at a time other than during an online class:
the first request; and the plurality of attempt steps;
receiving, by the server, from the instructor client device, the alternative plurality of events solving the problem or question; and
generating, by the server, in response to a third request received subsequent to the first request and a receipt of the alternative plurality of events, the reproduction of the recorded collaborative environment.

4. The method of claim 1, further comprising the steps of:
generating, by the server, on a second GUI displayed on the instructor client device, a notification that the first request has been sent;
receiving, by the server, from the instructor client device, an instructor input indicating approval of the first request; and
displaying by the server, the collaborative environment on the first learner client device and the instructor client device.

5. The method of claim 1, further comprising the steps of generating, by the server, within the collaborative environment:
an extendable canvas in the shared canvas space;
a cursor displayed on the extendable canvas for each of a learner operating the first learner client device and an instructor operating the instructor client device;
a drawing area or text area configured to receive the plurality of events and the alternative plurality of events; and
an audio input configuration for capturing audio files from the learner and the instructor, the audio files synchronized with the plurality of events and the alternative plurality of events.

6. The method of claim 5, wherein the plurality of events and the alternative plurality of events comprise:
a plurality of scalable vector graphic (SVG) events comprising a plurality of mouse inputs; and
an audio input configuration for the learner and the instructor, synchronized with the plurality of SVG events.

7. The method of claim 1, further comprising the steps of:
identify a learning objective associated with each of the plurality of problems or questions; and
store, in the database, the learning objective associated with each of the plurality of problems or questions.

8. A system comprising:
a database coupled to a network and storing: a learning course content; and
a plurality of problems or questions associated with the learning course content;
a server including a computing device coupled to a network and including at least one processor executing instructions within a memory which, when executed, cause the system to:
receive, from a graphical user interface (GUI) displayed on a first learner client device, a first request to generate a collaborative environment including a shared canvas space;
generate, for display within the GUI, the collaborative environment, wherein the collaborative environment is configured to be manipulated by both the first learner client device and an instructor client device in an asynchronous manner and a real time manner, wherein manipulation of the collaborative environment includes modification of a canvas element of the shared canvas space by one or both of the first learner client device and the instructor device;
record, as a collaboration session, from the collaborative environment:
a plurality of attempt steps input into the shared canvas space of the collaborative environment using the first learner client device, the plurality of attempt steps including a plurality of events provided within the collaborative environment by a learner attempting to solve a problem or question in the plurality of problems or questions; and
at least one solution step input into the collaborative environment using the instructor client device in response to at least one of the plurality of attempt steps, wherein the at least one solution step:
identifies a timestamp within the plurality of events; and
generates an alternative plurality of events solving the problem or question;
receive, from the first learner client device or a second learner client device, a second request to reproduce the collaboration session from the collaborative environment recording; and
generate, for display on the first learner client device or the second learner client device, a reproduction of the collaboration session from the collaborative environment recording.

9. The system of claim 8, wherein the instructions, when executed, further cause the system to:
receive the first request from the first learner client device during an online class;
generate, for display on a plurality of learner client devices associated with the online class, the collaborative environment; and
transmit the collaborative environment to the plurality of learner client devices for display in real time.

10. The system of claim 8, wherein the instructions, when executed, further cause the system to:
receive from the first learner client device at a time other than during an online class:
the first request; and
the plurality of attempt steps;
receive, from the instructor client device, the alternative plurality of events solving the problem or question; and
generate, in response to a third request received subsequent to the first request and a receipt of the alternative plurality of events, the reproduction of the collaboration session from the collaborative environment recording.

11. The system of claim 8, wherein the instructions, when executed, further cause the system to:

generate, on a second GUI displayed on the instructor client device, a notification that the first request has been sent;

receive, from the instructor client device, an instructor input indicating approval of the first request; and display the collaborative environment on the first learner client device and the instructor client device.

12. The system of claim 8, wherein the instructions, when executed, further cause the system to generate, within the collaborative environment:

an extendable canvas in the shared canvas space;

a cursor displayed on the extendable canvas for each of a learner operating the first learner client device and an instructor operating the instructor client device;

a drawing area or text area configured to receive the plurality of events and the alternative plurality of events; and an audio input configuration for capturing audio files from the learner and the instructor, the audio files synchronized with the plurality of events and the alternative plurality of events.

13. The system of claim 12, wherein the plurality of events and the alternative plurality of events comprise:

a plurality of scalable vector graphic (SVG) events comprising a plurality of mouse inputs; and an audio input configuration for the learner and the instructor, synchronized with the plurality of SVG events.

14. The system of claim 8, wherein the instructions, when executed, further cause the system to:

identify a learning objective associated with each of the plurality of problems or questions; and store, in the database, the learning objective associated with each of the plurality of problems or questions.

15. A system comprising a server, including a computing device coupled to a network and including at least one processor executing instructions within a memory, and configured to:

store, within a database coupled to a network, a plurality of problems or questions associated with a learning course content;

receive, from a graphical user interface (GUI) displayed on a first learner client device, a first request to generate a collaborative environment including a shared canvas space, wherein the collaborative environment is configured to be manipulated by both the first learner client device and an instructor client device in an asynchronous manner and a real time manner and wherein manipulation of the collaborative environment includes modification of a canvas element of the shared canvas space by one or both of the first learner client device and the instructor device;

generate, for display within the GUI, the collaborative environment;

record, from the collaborative environment:

a plurality of events provided within the shared canvas space of the collaborative environment by a learner attempting to solve a problem or question in the plurality of problems or questions; and at least one solution step input into the collaborative environment using the instructor client device in response to at least one of the plurality of events;

receive, from the first learner client device or a second learner client device, a second request to reproduce the recorded collaborative environment; and generate, for display on the first learner client device or the second learner client device, a reproduction of the recorded collaborative environment.

16. The system of claim 15, wherein:

the plurality of events includes a plurality of attempt steps input into the collaborative environment; and the at least one solution step:

identifies a timestamp within the plurality of events; and generates an alternative plurality of events solving the problem or question.

17. The system of claim 16, wherein the server is further configured to:

receive the first request from the first learner client device during an online class;

generate, for display on a plurality of learner client devices associated with the online class, the collaborative environment; and transmit the collaborative environment to the plurality of learner client devices for display in real time.

18. The system of claim 16, wherein the server is further configured to:

receive from the first learner client device at a time other than during an online class: the first request; and the plurality of attempt steps;

receive, from the instructor client device, the alternative plurality of events solving the problem or question; and generate, in response to a third request received subsequent to the first request and a receipt of the alternative plurality of events, the reproduction of the recorded collaborative environment.

19. The system of claim 16, wherein the server is further configured to generate, within the collaborative environment:

an extendable canvas in the shared canvas space;

a cursor displayed on the extendable canvas for each of a learner operating the first learner client device and an instructor operating the instructor client device;

a drawing area or text area configured to receive the plurality of events and the alternative plurality of events; and an audio input configuration for capturing audio files from the learner and the instructor, the audio files synchronized with the plurality of events and the alternative plurality of events.

20. The system of claim 16, wherein the plurality of events and the alternative plurality of events comprise:

a plurality of scalable vector graphic (SVG) events comprising a plurality of mouse inputs; and an audio input configuration for capturing audio files from the learner and the instructor, the audio files synchronized with the plurality of SVG events.

* * * * *